(12) United States Patent
Marquardt

(10) Patent No.: US 9,515,483 B2
(45) Date of Patent: Dec. 6, 2016

(54) CIRCUIT ARRANGEMENTS FOR ELECTRONICALLY CONTROLLED DC GRIDS

(75) Inventor: Rainer Marquardt, Ottobrunn/Riemerling (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 863 days.

(21) Appl. No.: 13/988,936

(22) PCT Filed: Nov. 22, 2011

(86) PCT No.: PCT/EP2011/070674
§ 371 (c)(1),
(2), (4) Date: Jun. 19, 2013

(87) PCT Pub. No.: WO2012/069468
PCT Pub. Date: May 31, 2012

(65) Prior Publication Data
US 2013/0256109 A1    Oct. 3, 2013

(30) Foreign Application Priority Data
Nov. 22, 2010 (DE) .......... 10 2010 052 136

(51) Int. Cl.
| | |
|---|---|
| *H02J 1/00* | (2006.01) |
| *H01H 33/59* | (2006.01) |
| *H02H 3/087* | (2006.01) |
| *H01J 3/36* | (2006.01) |

(52) U.S. Cl.
CPC .............. *H02J 1/00* (2013.01); *H01H 33/596* (2013.01); *H01J 3/36* (2013.01); *H02H 3/087* (2013.01); *Y02E 60/60* (2013.01)

(58) Field of Classification Search
CPC ............. H01H 33/596; H02J 1/00; H02J 3/36; H02J 7/0034; H02J 1/10; Y02E 60/60; H02H 3/087; H02H 11/002; H02H 11/004; H02H 11/003
USPC ......................................................... 307/127
See application file for complete search history.

(56) References Cited

U.S. PATENT DOCUMENTS

| | | | | |
|---|---|---|---|---|
| 3,466,503 A | * | 9/1969 | Goldberg ................. | H01H 9/46 315/60 |
| 3,497,771 A | * | 2/1970 | Korkka .................... | H02H 7/16 315/241 R |
| 3,814,878 A | * | 6/1974 | Weston ................... | H01H 21/58 200/327 |

(Continued)

FOREIGN PATENT DOCUMENTS

| | | |
|---|---|---|
| DE | 2311744 A1 | 9/1974 |
| DE | 10 2007 004 528 B3 | 8/2008 |

(Continued)

*Primary Examiner* — Jared Fureman
*Assistant Examiner* — Brian K Baxter
(74) *Attorney, Agent, or Firm* — Laurence Greenberg; Werner Stemer; Ralph Locher

(57) ABSTRACT

Switching and switchover devices for DC networks make it possible to realize, particularly in the event of faults, rapid and reliable switching processes in combination with good overvoltage damping and low energy losses during normal operation. The switching devices furthermore have short turn-off times and require no cooling since they have no on-state power losses during normal operation.

14 Claims, 13 Drawing Sheets

(56) References Cited

U.S. PATENT DOCUMENTS

| | | | | | |
|---|---|---|---|---|---|
| 4,305,107 | A | * | 12/1981 | Murano | H02H 7/222 361/4 |
| 5,452,170 | A | * | 9/1995 | Ohde | H01H 33/596 174/DIG. 17 |
| 5,517,378 | A | * | 5/1996 | Asplund | H01H 33/596 361/3 |
| 5,666,257 | A | * | 9/1997 | Yang | H01H 33/596 361/139 |
| 5,793,586 | A | * | 8/1998 | Rockot | H01H 33/596 361/8 |
| 5,854,729 | A | * | 12/1998 | Degeneff | H01H 33/596 361/13 |
| 5,999,388 | A | * | 12/1999 | Asplund | H02H 3/087 323/908 |
| 6,028,760 | A | * | 2/2000 | Ferreira | G01V 3/165 361/171 |
| 6,304,422 | B1 | * | 10/2001 | Sander | H02H 11/003 307/127 |
| 6,313,593 | B1 | * | 11/2001 | Matsubara | H02P 5/74 318/434 |
| 2001/0054881 | A1 | * | 12/2001 | Watanabe | H02J 7/0065 320/166 |
| 2002/0039268 | A1 | * | 4/2002 | Bryan | H01H 33/596 361/42 |
| 2002/0135234 | A1 | * | 9/2002 | Chekhet | H02M 5/271 307/82 |
| 2005/0146814 | A1 | * | 7/2005 | Sellier | H01H 3/222 361/8 |
| 2006/0067021 | A1 | * | 3/2006 | Li | H01C 7/126 361/30 |
| 2008/0054857 | A1 | * | 3/2008 | Cook | H02P 1/22 322/13 |
| 2008/0304198 | A1 | * | 12/2008 | Chishima | H02H 3/087 361/93.7 |
| 2009/0002901 | A1 | * | 1/2009 | Matsumoto | H03K 17/08122 361/18 |
| 2010/0066174 | A1 | * | 3/2010 | Dommaschk | H02M 1/32 307/75 |

FOREIGN PATENT DOCUMENTS

| | | |
|---|---|---|
| JP | 2006032077 A | 2/2006 |
| RU | 2231191 C2 | 6/2004 |
| WO | 2008067786 A1 | 6/2008 |
| WO | 2008090175 A1 | 7/2008 |

\* cited by examiner

CIRCUIT ARRANGEMENTS FOR ELECTRONICALLY CONTROLLED DC GRIDS

BACKGROUND OF THE INVENTION

Field of the Invention

The invention relates to a device for switching in a DC voltage grid.

The invention furthermore relates to a method for interrupting a direct-current power grid.

Power electronic systems in the field of energy supply—with very high required voltages and powers—are becoming increasingly important. Particularly for future, spatially extensive, multiterminal high-voltage direct-current (HVDC) grids, circuit arrangements are required which enable possible cases of disturbance to be controlled reliably and rapidly and also make possible extremely low energy losses during normal operation. These requirements arise particularly in the case of future DC grids with high voltages and long-distance transmission across countries. For the very high powers required, hitherto use has predominantly been made of converters with conventional thyristors and impressed direct current (line-commutated converters, LCC). However, line-commutated converters will not satisfy the more stringent requirements in the future with regard to highly dynamic power factor correction, grid voltage stabilization and expedient usability of DC cables (direct-current cables).

Moreover, the types of converter used with impressed direct current (current source converter) are not suitable for the advantageous realization of HVDC multiterminal grids. As a preferred type of circuit, therefore, use is made of self-commutated converters with impressed DC voltage (voltage source converter, "VSC"). The inherent disadvantages of this type of circuit have been eliminated by recent developments—in particular the measures described in DE 10103031A1 "converter circuits with distributed energy stores". The prerequisites for controlling short circuits in the connected DC grids have become significantly more expedient as a result of the omission of capacitor banks on the DC side. Despite the development advance mentioned, the reliable, rapid and reversible control of important cases of disturbance in spatially extensive HVDC grids has not been solved satisfactorily to date.

Corresponding, spatially extensive, multiterminal HVDC grids will be urgently required in the future inter alia for extensive offshore wind farms and the use of large solar power plants in remote desert regions. In particular, short circuits in the HVDC grid must be able to be controlled and faulty/short-circuited sections of the grid must be able to be isolated.

Expedient mechanical switches for the extremely high DC voltages which can switch high fault currents under load are not available owing to fundamental physical problems. The technically achievable turn-off times and the switching overvoltages of mechanical switches are also extremely disturbing. In accordance with the prior art, therefore, mechanical switches for these applications can be expediently realized only as disconnectors that switch without load (without current).

FIG. 1 shows-for further explanation of the prior art-an excerpt from a spatially extensive multiterminal HVDC grid. It shows by way of example a busbar having the conductors PS and NS, which relative to ground generally carry a positive (PS) and respectively negative (NS) voltage during normal operation. The total voltage difference between the two conductors is designated by (Ud0). Each of the connected subsystems is connected to a floating three-phase grid via a three-phase voltage source converter. The potential isolation is generally effected by means of conventional transformers designed for the grid frequency (predominantly 50 Hz or 60 Hz). As a result, it is possible, inter alia, to operate the DC grid in a floating manner and in a balanced manner relative to ground (FIG. 1) or in a non-floating manner and in an unbalanced manner relative to ground (FIG. 2).

The representations are as follows:
6: DC-side line inductances
7: DC-side switches
701: Equivalent circuit of a first three-phase grid
702: Equivalent circuit of a second three-phase grid
801, 802: Three-phase-side mechanical circuit-breakers
901: First voltage source converter (VSC), having the three-phase-side connections (L1, L2, L3) and the DC-side connections (P1, N1), which lead via DC-side switches (7) to the DC busbar (PS, NS).
902: Second voltage source converter-analogous to 901- connected to the second three-phase grid, the DC-side connections (P2, N2) of which likewise lead via further DC-side switches (7) to the DC busbar (PS, NS).

Owing to a series of fault events in the DC system-in particular conductor/conductor short circuits or ground faults-the DC-side currents can assume impermissibly high values. In order to control these faults, it is desirable for
  the resulting high currents to be limited as well as possible in order to avoid converter and installation damage owing to extreme temperatures and magnetic force effects, and
  defective sections of the DC grid to be deenergized and isolated from the rest of the DC grid as rapidly as possible.

In accordance with the prior art, inter alia WO 2008/067786: "Semiconductor protective elements for controlling DC-side short circuits in voltage source converters" discloses that opening of the three-phase-side circuit-breakers (801, 802) for the purpose of limiting DC-side fault currents is made possible, but is very disadvantageous. The resulting high currents and/or the long turn-off times necessitate further, costly protective measures for the semiconductors of the voltage source converters (901, 902)—as is explained in the patent specification mentioned above. Furthermore, the energy transmission is interrupted for a disturbingly long time. It is accordingly desirable for the three-phase-side currents (iu, iv, iw) to be disturbed as little as possible and for a tripping of the three-phase-side circuit-breakers (801, 802) to be avoided. A further important aim is to maintain the power flow in the non-faulty parts of the HVDC grid or to reestablish it as rapidly as possible. However, a tripping and renewed switching-on of the three-phase-side circuit-breakers (801, 802) would already cause very disturbing interruption times of generally significantly more than 200 ms. A direct replacement of mechanical circuit-breakers by electronic circuit-breakers on the DC side is known and makes possible significantly shorter switching times (see, inter alia, US005999388A: "Method and apparatus for limiting current in a direct voltage network of a power transmission system").

Such an arrangement is illustrated in FIG. 3 for the purpose of further explanation.

There are required for this purpose
  turn-off power semiconductors (1), generally in the form of IGBT transistors, antiparallel diodes (2) or further turn-off power semiconductors, measures for uniform voltage division among the semiconductors, generally high-resistance snubber resistors (5), overvoltage limiters having high energy absorption capacity (8), generally in the form of varistors.

In the present field of application-which is characterized by very high voltages and powers and largely continuous operation—the disadvantages of such a solution are, however, very serious.

Said disadvantages include:

the high number of series-connected semiconductors (1, 2);

the required forced cooling of the semiconductors, since the latter generate high on-state losses during continuous operation;

the requirement of electronic gate driving of said semiconductors at high potential relative to ground and the reliable provision of the drive energy therefor at said high potential;

the high outlay, which cannot be reduced even when a plurality of switches are realized at one location;

the considerable power loss in the on state of the semiconductors, this state corresponding to normal continuous operation—as a result of which the ongoing operating costs of the installation are increased;

during the turn-off process, additional overvoltage protection units (8) at the individual semiconductor switches have to absorb the considerable magnetic energies of the turned-off grid sections of the DC grid.

The point mentioned last is very disadvantageous because, on account of the large number of overvoltage protection units (8) required, generally only simple varistors having a non-ideal limiter characteristic curve can be used. The number of series-connected semiconductors required rises again as a result.

A further increase in the outlay and the on-state losses occurs if the electronic switch has to be able to be turned off in both current directions (see FIG. 3, lower part). This requirement occurs if the electronic switch is intended to be useable at arbitrary locations of a general DC grid.

BRIEF SUMMARY OF THE INVENTION

It is an object of the invention to avoid these disadvantages and to make possible expediently realizable circuit arrangements for DC switches having the following essential properties:

the achievable turn-off times are very short, such that three-phase-side switches do not have to be triggered and the energy flow in the DC grid is not appreciably disturbed;

the semiconductors do not require forced cooling, since they have no on-state power loss during normal continuous operation;

the drive energy for the semiconductors can be obtained from the reverse voltage present at the semiconductors themselves;

the switching overvoltages can be fixed and limited by the dimensioning of the components to expedient values that enable the insulations in the DC grid to be dimensioned economically;

in the typical application of realizing a plurality of switches at one location, the outlay on circuitry can be further reduced by the use of common components.

The invention achieves these objects by means of a device for switching direct currents in a DC voltage grid comprising two hybrid switches connected in series in opposite directions, said hybrid switches each having a parallel circuit comprising an uncontrolled current-direction-dependent switch and a controllable switch, wherein the internal junction point between the hybrid switches forms a third connection and the two hybrid switches connected in series in opposite directions can be inserted by a first and a second connection into a first line of a DC voltage grid; comprising two polarized damping elements, which are designed to absorb energy in only one polarity of the terminal voltage present, wherein the first polarized damping element is connected to the first connection of the series-connected hybrid switches and can be connected to a second line of the DC voltage grid and/or a ground potential and the second polarized damping element is connected to the second connection of the series-connected hybrid switches and can be connected to the second line of the DC voltage grid and/or the ground potential; and comprising a current pulse generator, which—in response to a control command—is designed to generate a unipolar current pulse passing via the third connection and the polarized damping elements, such that the current direction in one of the hybrid switches can be momentarily reversed.

The subsystems mentioned, that is to say the hybrid switch, the damping element and the current pulse generator, in conjunction with the circuit arrangements according to the invention described below, make it possible to realize single-pole and multi-pole DC switches having the advantageous properties mentioned.

A further characterizing property of all the subsystems according to the invention is their implementability as a two-terminal network. This makes possible not only a reduced number of external connections ("terminals"), but a generous cascadability, that is to say that any higher-voltage subsystem can be formed at any time by a series circuit comprising an arbitrary number of low-voltage subsystems. Furthermore, this procedure according to the invention makes possible a consistent redundancy concept which enables the DC switch to function reliably even in the event of defects in individual or a plurality of subsystems.

In this context, a further technical advantage is afforded by the fact that the subsystems according to the invention do not require semiconductors having fault-critical contact lines that are not resistant to a surge current—such as e.g. bonding wires in the case of IGBT transistors. Since the circuit arrangements according to the invention can be realized exclusively with semiconductor diodes and thyristors as semiconductors, it is possible, in contrast, to use components with pressure contact-connection that is resistant to surge currents.

In particular, the arbitrary series connectability of all the subsystems according to the invention enables a free choice of the rated voltage of the components used, independently of the predefined voltage of the DC grid. One aspect involves in this regard economic reasons and the commercial availability of the components. However, a technically more important degree of freedom which results from this property is the optimization of the switching speed of the DC switches that can be realized.

For the circuit arrangements according to the invention, this explained degree of freedom of the two-terminal network property and the arbitrary cascadability makes it possible to obtain a high required switching speed. As will also be explained below, the components that are relevant here can be significantly improved with regard to their switching speed by the choice of a lower rated voltage. This applies e.g. to vacuum interrupters (on account of shorter mechanical actuation distances and smaller masses) and also, as is known, to semiconductor diodes and thyristors with regard to their reverse recovery times and/or recovery times.

In the context of the invention, the polarized damping element situated opposite to the current flow direction and the hybrid switch situated opposite to the current flow direction can also be omitted if only overcurrents in this one current flow direction occur.

The invention also achieves the abovementioned object by means of a method for interrupting a direct-current power grid comprising the following steps: generating a current pulse which, in a hybrid switch having a parallel circuit comprising an uncontrolled current-direction-dependent switch and a controllable switch, momentarily brings about a current reversal on the side situated in the current flow direction, such that the controllable switch of the hybrid switch can quench during the current reversal and thus isolates the current feed between a source and a load, wherein a polarized damping element on the side situated in the current flow direction damps the polarity-reversed voltage on the side situated in the current flow direction and thereby deenergizes the load-side line inductance, wherein a current pulse generator damps the elevated voltage on the side situated opposite to the current flow direction.

Further expedient configurations and advantages of the invention are the subject of the following description of exemplary embodiments of the invention with reference to the figures of the drawing, wherein identical reference signs refer to identically acting component parts and wherein

DESCRIPTION OF THE INVENTION

Figure 1:
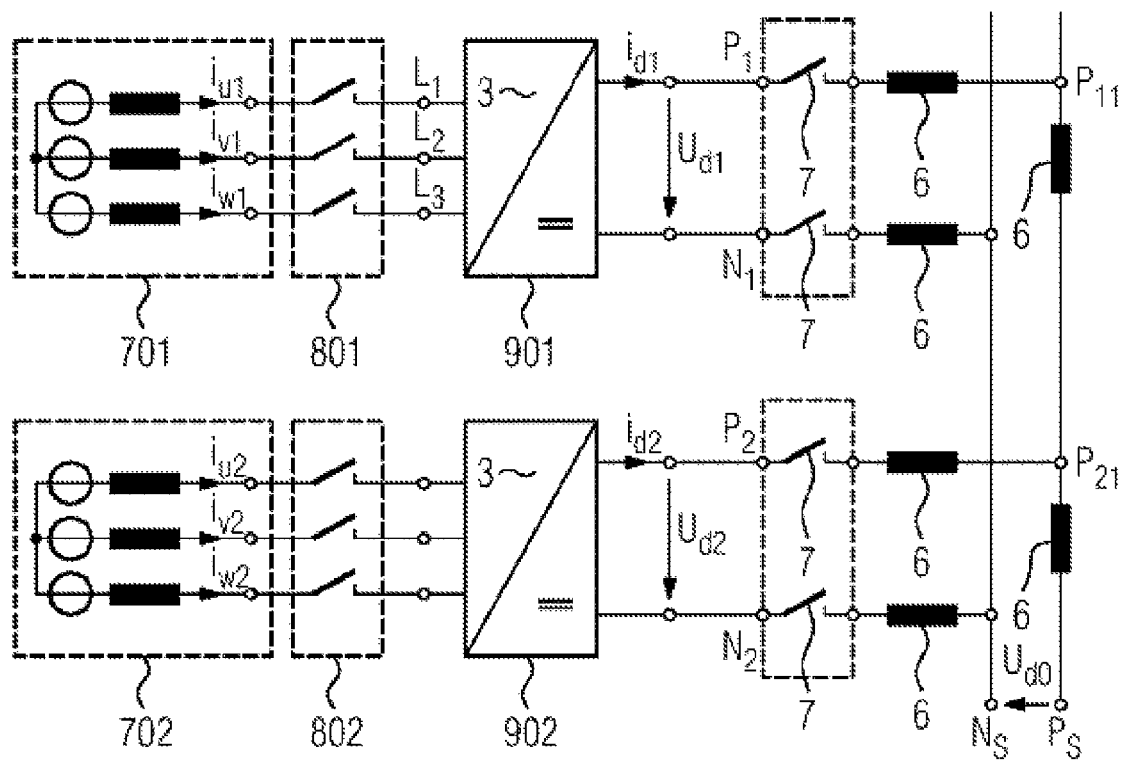
FIGS. 1-3 in each case show an excerpt from a spatially extensive muliterminal DC voltage grid in accordance with the prior art.
Figure 2:
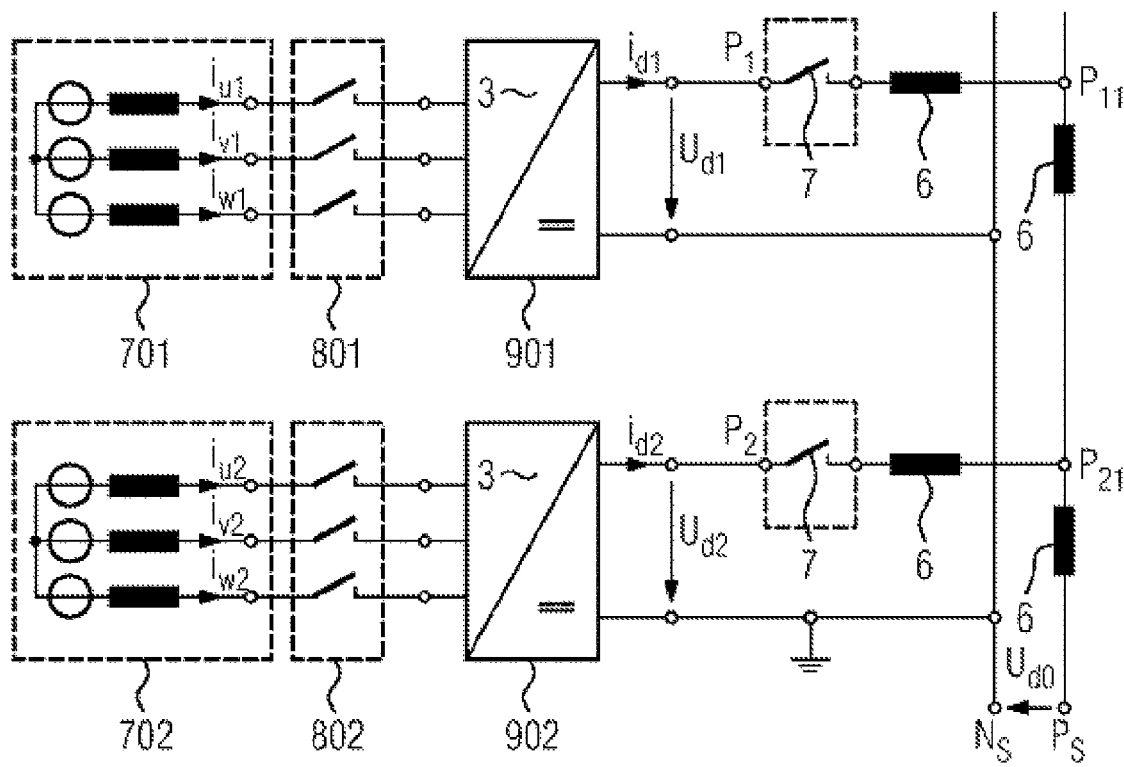
Figure 3:
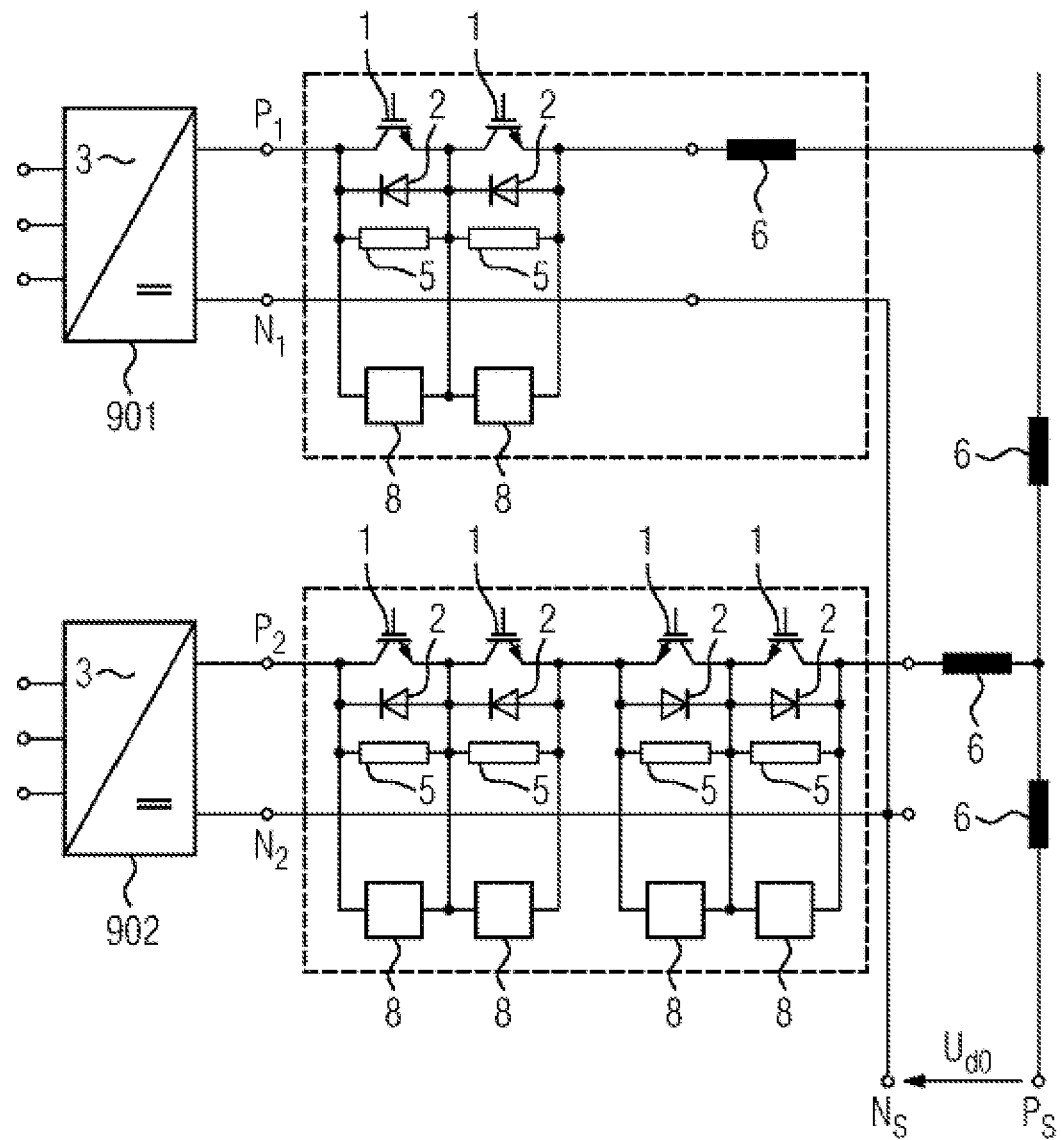

FIGS. 1 to 3 have already been described as associated with the prior art in the introductory part of the description.

Figure 4:
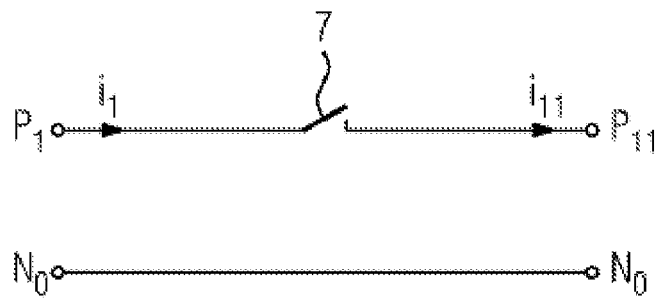
FIGS. 4-7 show basic DC switch arrangements, wherein the switches themselves are schematically symbolized by mechanical switches.

FIG. 4 shows a single-pole DC switch that is used in a simple DC grid (DC voltage or direct-current grid), generally grounded on one side, for isolating the positive line (P1 relative to P11). This arrangement can be sufficient if the negative line (N0) is unambiguously grounded.

Figure 5:
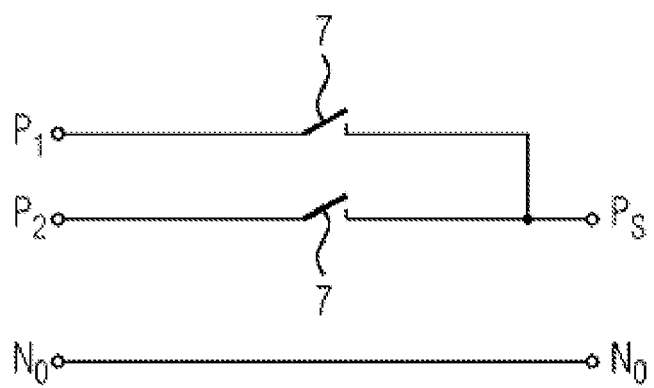

FIG. 5 shows an arrangement analogous to FIG. 4-but with a plurality (here for example: two) of DC switches-which lead onto a common busbar (PS).

Figure 6:
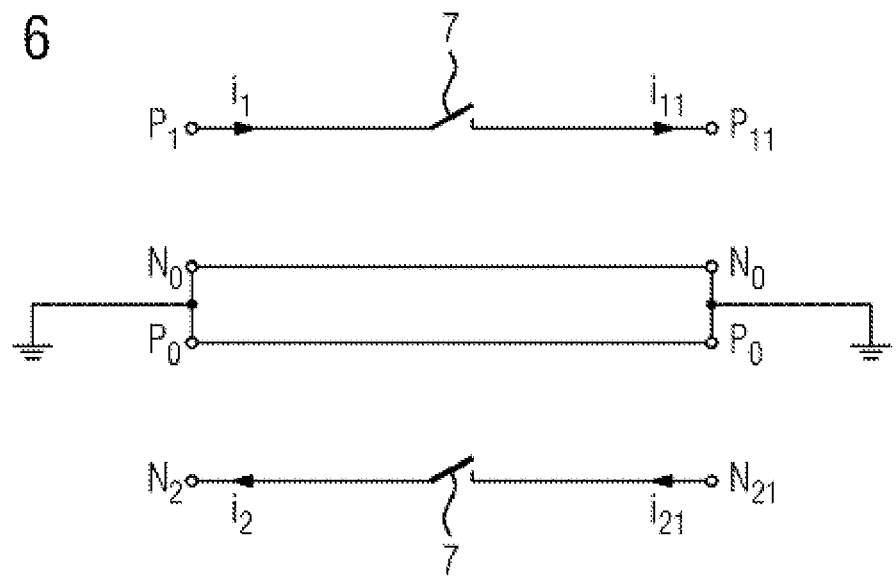

FIG. 6 shows an arrangement analogous to FIG. 4, to which has been added, however, a further DC line having negative polarity and an associated switch. The DC voltages (UP1 relative to N0) of the positive conductors and (UN2 relative to N0) of the negative conductors—in each case measured relative to the common grounded line—are generally chosen here to be identical in terms of magnitude. However, the load currents of the positive line (i1) and of the negative line (i2) can already be different in normal operation. Therefore, the two switches (7) are intended generally to be able to be turned off individually, that is to say independently of one another.

Figure 7:
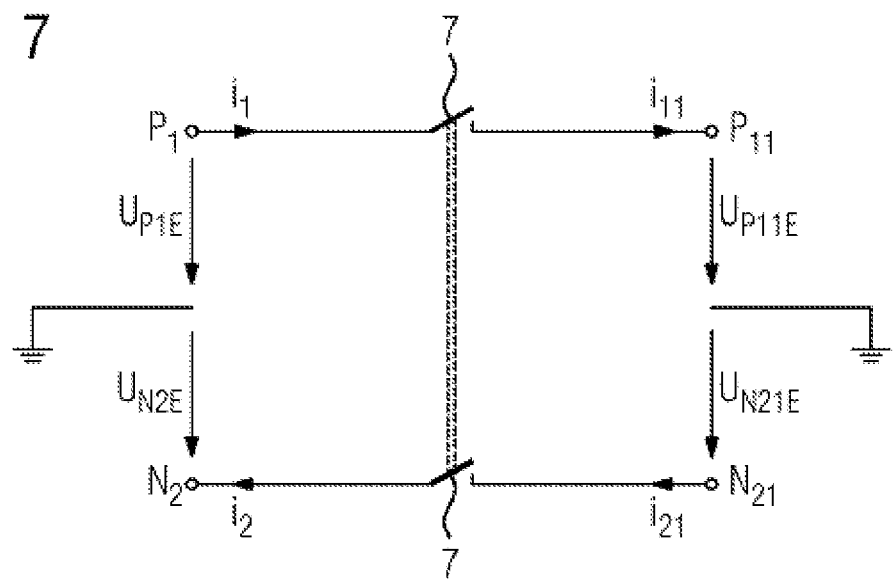

FIG. 7 shows an arrangement analogous to FIG. 6 but without a neutral line capable of carrying current. Suitable grounding measures—generally a high-resistance potential link by means of resistors—ensure that the voltages of the positive line (UP1E) and of the negative line (UN2E) relative to ground are divided in a balanced manner. In the case of ground faults, however, this potential distribution can shift, as a result of which the insulation is subjected to undesirably high stress. In an ungrounded DC grid of this type operated in a balanced manner, generally a two-pole turn-off is required in cases of disturbance, wherein the switches (7) can be actuated jointly. For the purpose of more detailed explanation of the invention, the realization of a single-pole switch shall firstly be elucidated (see FIG. 4).

Figure 8:
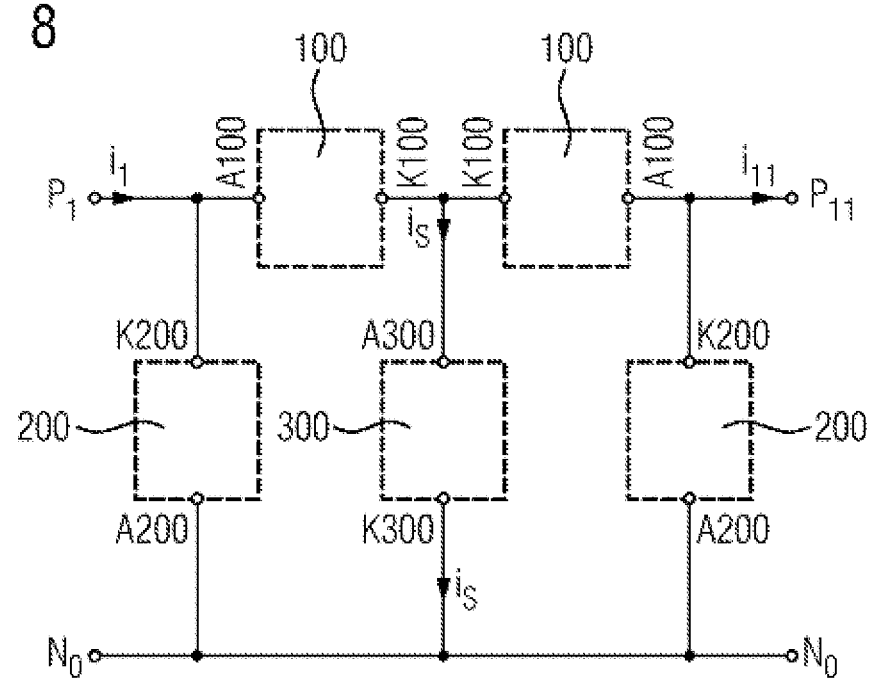
FIGS. 8-12 show exemplary embodiments of the device according to the invention.
Figure 13:
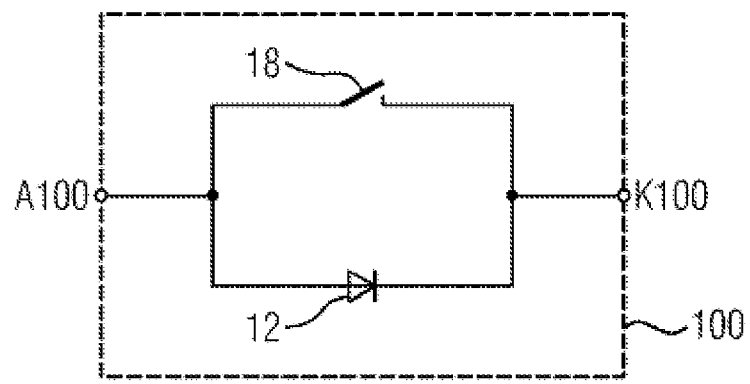
FIGS. 13-19 show exemplary embodiments of a hybrid switch, a polarized damping element and a current pulse generator.
Figure 14:
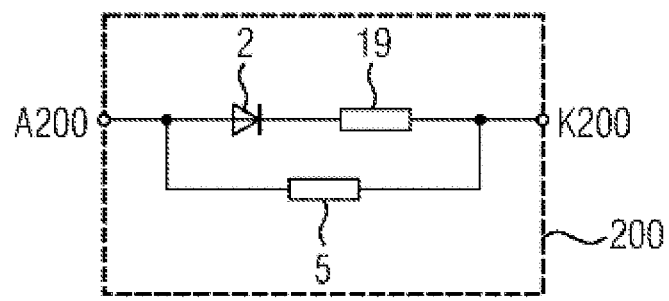
Figure 15:
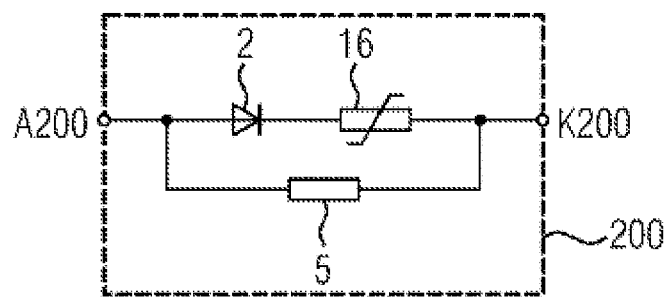
Figure 16:
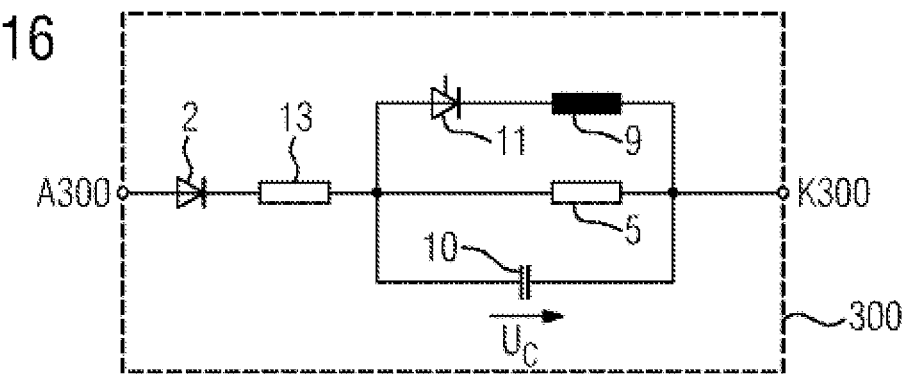

A corresponding realization according to the invention is illustrated in FIG. 8. In principle, circuit arrangements according to the invention for realizing single-pole or multi-pole DC switches contain the following subsystems characterized by the following properties:

a) Switching units, called hybrid switches (100) hereinafter, which have internally a parallel circuit comprising uncontrolled switches (12) and controllable switches (18). In this case, the uncontrolled switch (12) is preferably embodied as at least one semiconductor diode and the controlled switch (18) is preferably embodied as at least one vacuum interrupter (FIG. 13).

b) Polarized damping elements (200), which absorb energy dissipatively in one polarity of the terminal voltage present and oppose a current flow and consequently an energy conversion in the opposite polarity of the terminal voltage present. These polarized damping elements are preferably realized as a series circuit comprising linear (19) or nonlinear (15) resistors and semiconductor diodes (2) (FIG. 14, FIG. 15).

c) Current pulse generators (300) which generate a unipolar current pulse in response to an external control command. Said current pulse generators contain at least one capacitive energy store (10), which is charged from the DC voltage present at the terminals and which, in combination with further components (2, 13), forms a circuit branch for limiting overvoltages (FIG. 16).

Figure 9:
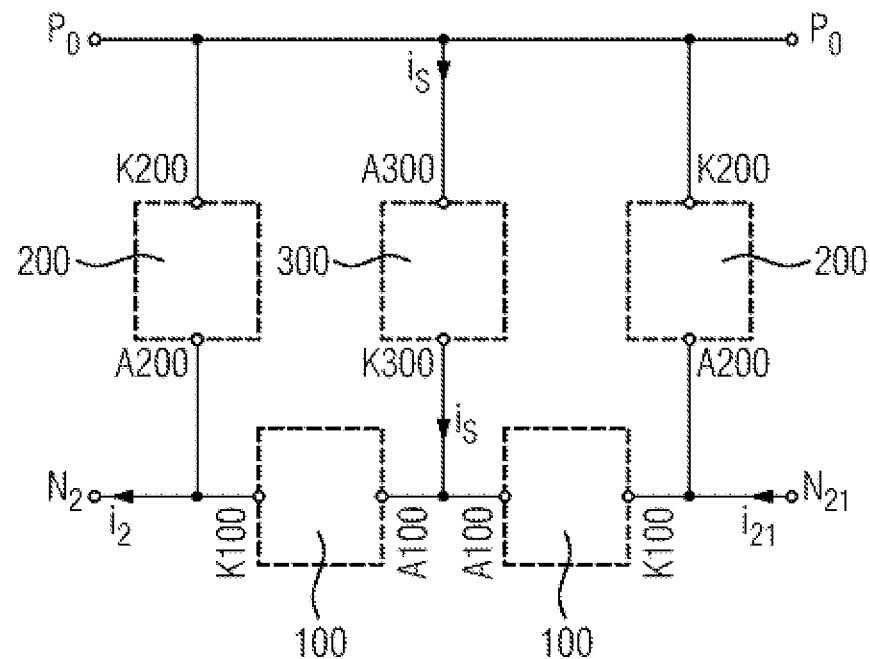

FIG. 9 shows an arrangement according to the invention analogous to FIG. 8—but with opposite polarity of all the subsystems. Such a variant is suitable for realizing a DC switch in a DC grid of opposite polarity. This corresponds, in principle, to the lower switch (7) in FIG. 6, which isolates the points (N2) and (N21). If the points (P0) from FIG. 9 are electrically conductively connected to the points (N0) from FIG. 8, this results in an arrangement analogous to that already described in FIG. 6.

Figure 10:
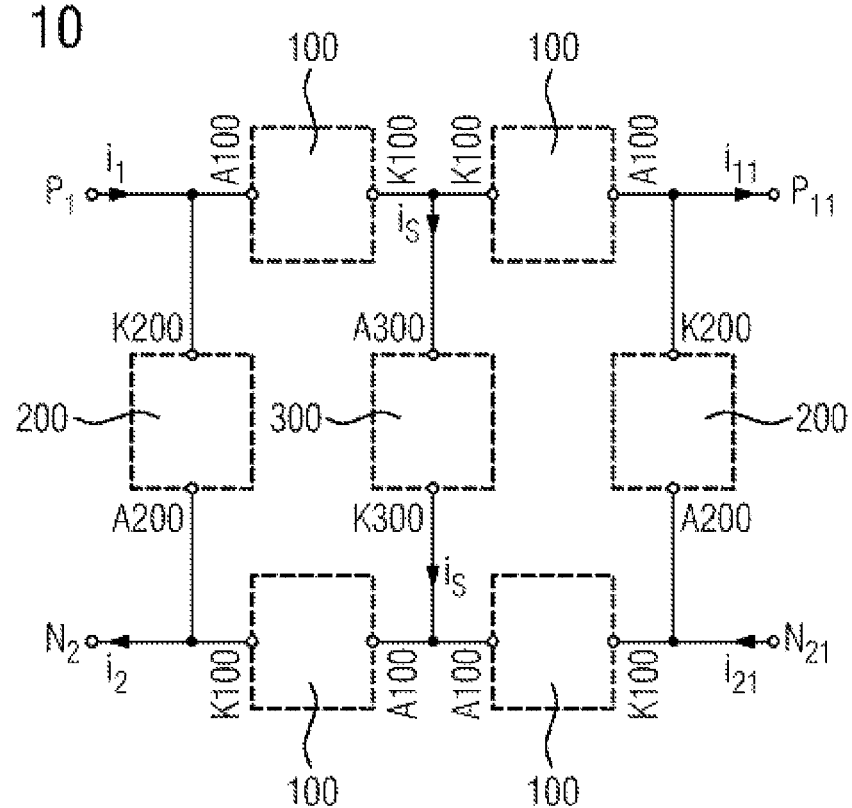

FIG. 10 shows an arrangement according to the invention which realizes the function of the two-pole DC switch according to FIG. 7. It is advantageous that both the polarized damping elements (200) and the current pulse generator (300) are required only once.

Figure 11:
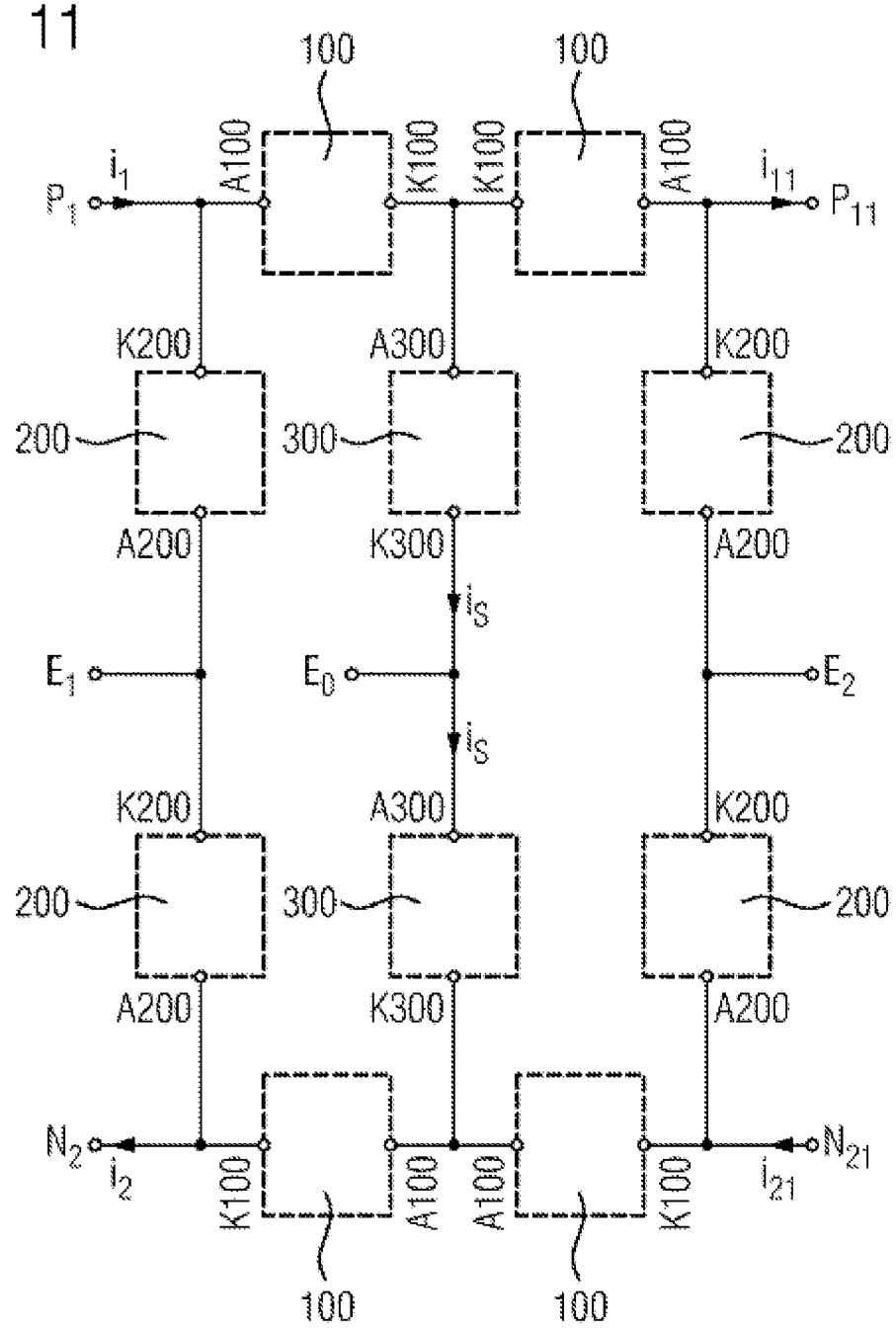

FIG. 11 shows an arrangement according to the invention analogous to FIG. 10. In contrast to FIG. 10, the current pulse generators (300) and the polarized damping elements (200) are divided in such a way that there is a possibility of grounding at their junction points (E). This can be expedient depending on the grounding concept of the DC grid. In particular, the grounding of the junction point (E0) makes it possible that in a DC grid operated in a floating and ground-balanced manner (FIG. 7 and associated explanation) the undesirable potential shift in the case of ground faults can be limited by the overvoltage-limiting property of the subsystems (300) and also (400)—if present. What can be achieved as a result is that the insulations of the components of the DC grid are subjected to less stress.

Figure 12:
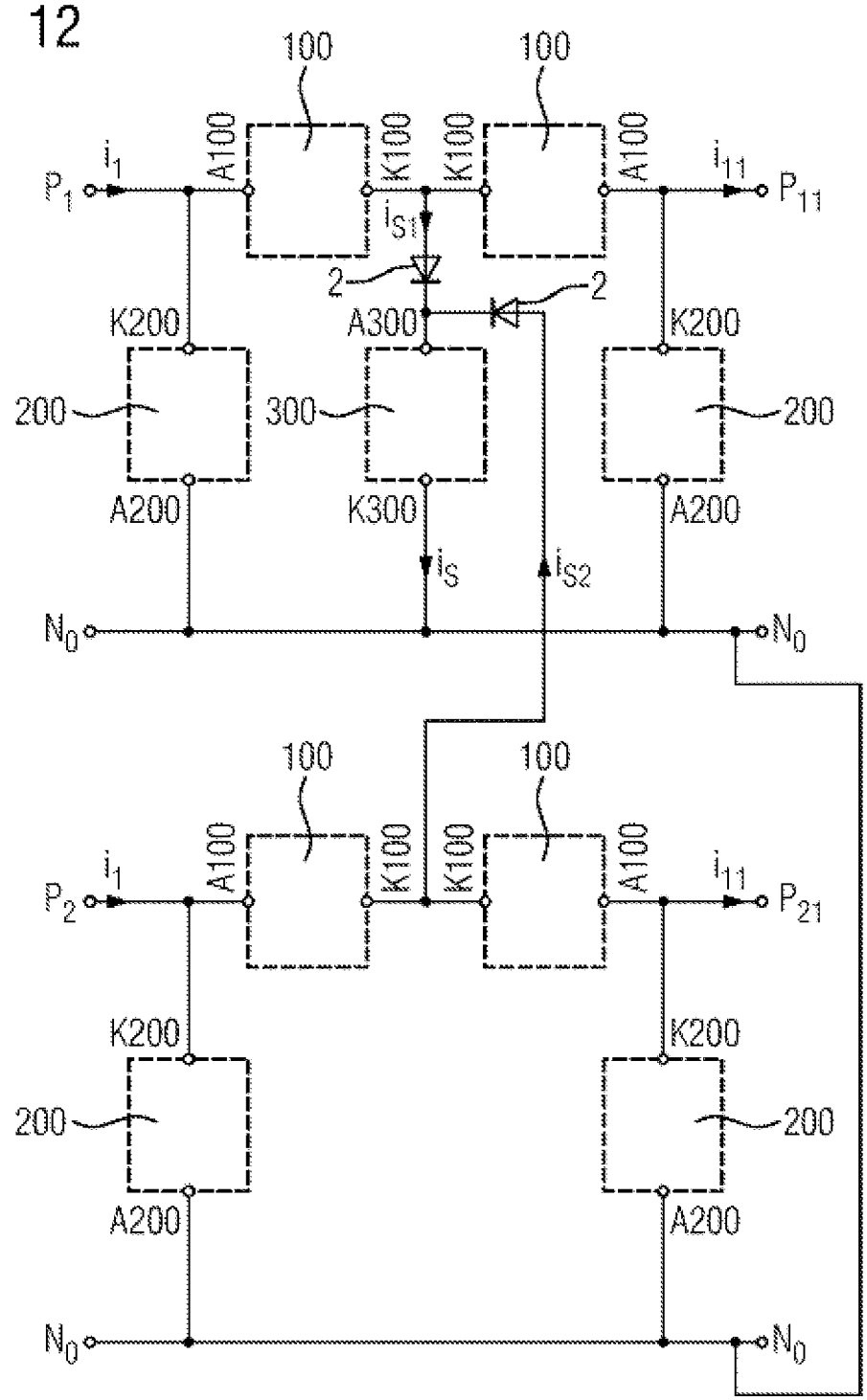

FIG. 12 shows a circuit arrangement according to the invention which realizes the function of the multiple switches (7) illustrated in FIG. 5 on a common busbar. It is advantageous that the current pulse generator (300) is required only once, because its current pulse (iS) can be distributed by the diodes (2). With reference to FIG. 8, for the purpose of further explanation of the invention, the realization of a single-pulse switch shall be explained again below. A DC switch of this type serves for rapidly turning off under load current and ultimately enabling an isolation of the DC lines between two grid sections of the DC grid. The safe isolation and grounding subsequently required—for possible repair work on the DC line—is not the subject of the present invention. Suitable apparatuses for this purpose are known and can be realized well from a technical standpoint because these apparatuses only have to operate subsequently—in the already deenergized state of the DC line—and without special requirements made of the switching speed.

According to the invention, two hybrid switches (100) are to be connected in series in opposite directions between the grid sections to be isolated. A current pulse generator (300) is connected to the junction point of the two hybrid switches (100). Each of the grid sections to be isolated is furthermore connected up to a respective polarized damping element (200). Such a configuration makes it possible, then, that a high current pulse (iS) generated by the current pulse generator (300) and having the technical current direction (iS>0) depicted flows in a manner divided in parallel via both hybrid switches (100) and the polarized damping elements (200). The controlled switches (18) of the hybrid switches (100) were generally switched on before this point in time in order to minimize the energy losses (forward voltage drop) in the normal state of the current transmission. However, it is also possible, in principle, that one of the switches (18)—here the left-hand switch—was not switched on because the parallel uncontrolled switch (12) can conduct the current anyway. With regard to the energy losses in normal continuous operation, however, this is not advantageous, since the forward voltage drop of the switches (18) is generally less than that of the uncontrolled switches (12) by powers of ten. This holds true, in particular, if the switches (18) are embodied as vacuum interrupters and the uncontrolled switches (12) are embodied as semiconductor diodes. During the current pulse (iS)—or else already before that temporally, depending on switch type (18)—the controlled switches (18) are opened. The current in one of the two controlled switches (18) will tend toward zero given a sufficiently high current pulse (iS), such that this turns off without power. In the present example with positive current (i1>0), this will be the right-hand switch in FIG. 8. On account of the high energy stored in the power inductance (6), the associated load current (i11) in the associated DC grid section will instantaneously continue to flow via the polarized damping element (200) and decay there relative to the negative voltage of the damping element.

The associated load current in the other DC grid section (in this example where i1>0: the left-hand part (P1, i1)) will instantaneously continue to flow for the same reasons—but via the hybrid switch into the current pulse generator (300) and will decay relative to the terminal voltage of the current pulse generator. The embodiments according to the invention of the current pulse generator (300, 500) have in this regard the already explained property of limiting the overvoltages that result during switching processes by means of the internal circuit branch (10, 2, 13).

A further advantage of the circuit arrangements according to the invention is that both the current pulse generator (300) and an optional additional overvoltage limiter (400) for a given arrangement of a plurality of DC switches at one location are required only once. This corresponds to an advantageous multiple use. This fact is explained in even greater detail below—on the basis of the description of multi-pole switches.

For exhaustive explanation of the invention, it is now necessary to elucidate hereinafter the internal circuit of the subsystems, the internal functioning thereof and advantageous circuit variants:

FIG. 13 shows the internal circuit of a hybrid switch (100) according to the invention. Said hybrid switch contains a parallel circuit comprising an uncontrolled switch (12) and a controllable switch (18). Furthermore, an embodiment with internal series connection of these units is possible, of course. In principle, an arbitrary number of hybrid switches (100) can likewise be used as a series circuit in order to realize a hybrid switch of arbitrarily high voltage. Only simple, known measures for uniform voltage division—generally high-resistance snubber resistors (5)—have to be provided for this purpose (see the explanations concerning FIG. 3). One preferred embodiment of the invention consists in using semiconductor diodes for the uncontrolled switches (12) and vacuum interrupters for the controlled switches (18). In principle, other types of switches and semiconductor switches can also be used. With vacuum interrupters of medium switching voltage, very short turn-off delay times can be achieved on account of the very short actuation distances and the small masses moved. For this purpose, it is known to be advantageous to draw the required mechanical energy for actuating the switch from a prestressed string, a compressed-air accumulator or a hydraulic accumulator.

FIG. 14 shows the internal circuit of a polarized damping element (200). In its simplest embodiment, said damping element contains a damping resistor (19) and a semiconductor diode (2). Measures for uniform voltage division for the semiconductor diodes with series connection can additionally be employed in known form, e.g. by means of high-resistance snubber resistors (5).

FIG. 15 shows one possible variant of FIG. 14, in which the damping resistor (19) is replaced by a varistor (16). This has the advantage that the current in a disconnected section of the DC grid decays more rapidly than is the case when complying with a predefined, low overvoltage, by means of a linear (ohmic) damping resistor.

FIG. 16 shows one preferred internal circuit of the current pulse generator (300). It contains the following elements in an arrangement according to the invention:

Blocking diode (3)
Series resistor (13)
Controlled semiconductor switch (11), generally preferably in the form of a thyristor
Capacitive energy store (10)
Inductance (9)
High-resistance snubber resistor (5)

The capacitive energy store (10) is automatically charged via the units (2) and (13) to the DC voltage at the corresponding connection point of the DC grid. At the same time, the current path via the units (2), (13) and (10) advantageously produces overvoltage damping at the corresponding connection point of the DC grid.

If a switching process of the hybrid switches (100) is intended to be initiated, the controlled semiconductor switch (11) is switched on. A thyristor that is triggered is assumed hereinafter, for the purpose of simple explanation. In the first quarter oscillation of the resonant circuit formed from (9) and (10), the energy of the capacitive energy store (10) is converted into the magnetic energy of the inductance (9). This first quarter oscillation proceeds without being damped, in principle, and can be chosen to be very short temporally. Its duration, as is known, is $$t_1 = \Pi/2 * \sqrt{LC}$$

where L denotes the inductance (9) and C denotes the capacitance of (10).

The current amplitude of the resulting current in (9) is $$i(t_1) = U_c(0) * \sqrt{C/L}$$

wherein $U_c(0)$ denotes the previously existing charging voltage of the capacitive energy store (10).

According to the invention, it is advantageous and technically readily achievable for the time ($t_1$) to be very short and the current amplitude $i(t_1)$ to be high. Both aims are substantially limited by the properties of the switch (11). In the case of a thyristor, these are the permissible rate of current rise and the permissible surge current amplitude. It is advantageous that the associated electric circuit in which the first quarter oscillation takes place passes only in a spatially narrow and defined circuit via the likewise well-definable units (9, 10, 11) and not via the DC grid. If the reason for the necessary switching process is a short circuit on the DC side, it will be expedient to identify this fault situation as rapidly as possible both by virtue of measured DC currents being exceeded and by virtue of rates of current rise on the DC side being exceeded, in order to trigger the thyristor (11) without great delays. However, this and other methods of rapid fault identification are known in principle and are not the subject of the present invention.

For the use of vacuum interrupters as controlled switches (18), it is expedient and possible to mechanically actuate them already at the same time as or shortly before the triggering of (11). This makes it possible to allow their mechanical turn-off delay time to proceed in parallel with the preparation for the electrical turn-off.

After the point in time ($t_1$), the voltage of the capacitive energy store (10) will assume negative values and the current in (9) and (11) will decrease until it becomes zero at the point in time ($t_2$). This further quarter oscillation proceeds in damped form in the circuit arrangements according to the invention on account of the series resistor (13) and the polarized damping elements (200). As a result, it is advantageously possible to make the effective duration of the generated current pulse ($i_s$) and also the hold-off time of the thyristor (11) significantly greater than the values that result—otherwise by virtue of the resonant circuit (9, 10). Furthermore, in the arrangement according to the invention it is possible for the dimensioning of the series resistor (13) to be made large enough that even in the case of arbitrary external short circuits (outside the current pulse generator (300)) the thyristor (11) reliably quenches after the end of the current pulse.

For this purpose, it suffices to choose a dimensioning corresponding to $$R_{13} = \sqrt{L/C}$$

for the series resistor (13). Independently thereof, the desired current amplitude generated by the current pulse generator (300) can be set as desired, as already explained, by the choice of its internal components (9, 10) and by the dimensioning of the components (19, 16) in the polarized damping elements (200, 201).

Another important parameter is the magnitude of the switching overvoltages that arise as a result of the switching processes in the DC grid. It is desirable to be able to predefine said switching overvoltages in a well-defined manner and to choose the magnitude of the switching overvoltages only to be high enough that the decay of the DC current in isolated DC grid sections takes place rapidly enough. The circuit arrangements according to the invention already fundamentally make this possible:

the negative switching overvoltages are limited by corresponding dimensioning of the polarized damping elements (200);

the positive switching overvoltages are limited by the components (2, 13, 10) of the current pulse generators (300).

However, the value mentioned last cannot be chosen independently of the dimensioning of the capacitive energy store (10). For this reason, a further measure in the form of an additional overvoltage limiter (400) can optionally be employed. It is expedient to connect said overvoltage limiter directly in parallel with (300) or cathodically to its diode (2).

Figure 17:
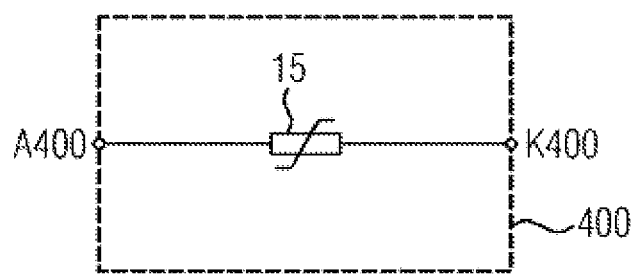
Figure 18:
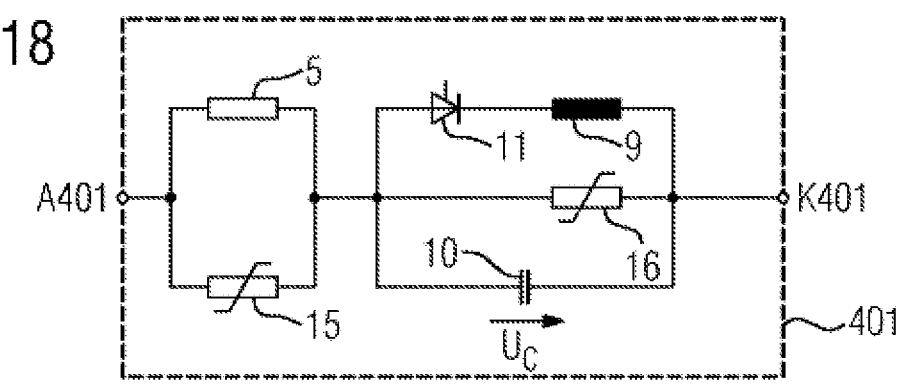

FIGS. 17 and 18 show possible embodiments. FIG. 17 illustrates the simple possibility of the use of a varistor (15), which in combination with components (2, 13, 10) already explained already makes possible significantly better overvoltage limiting than when they are used by themselves.

Figure 19:
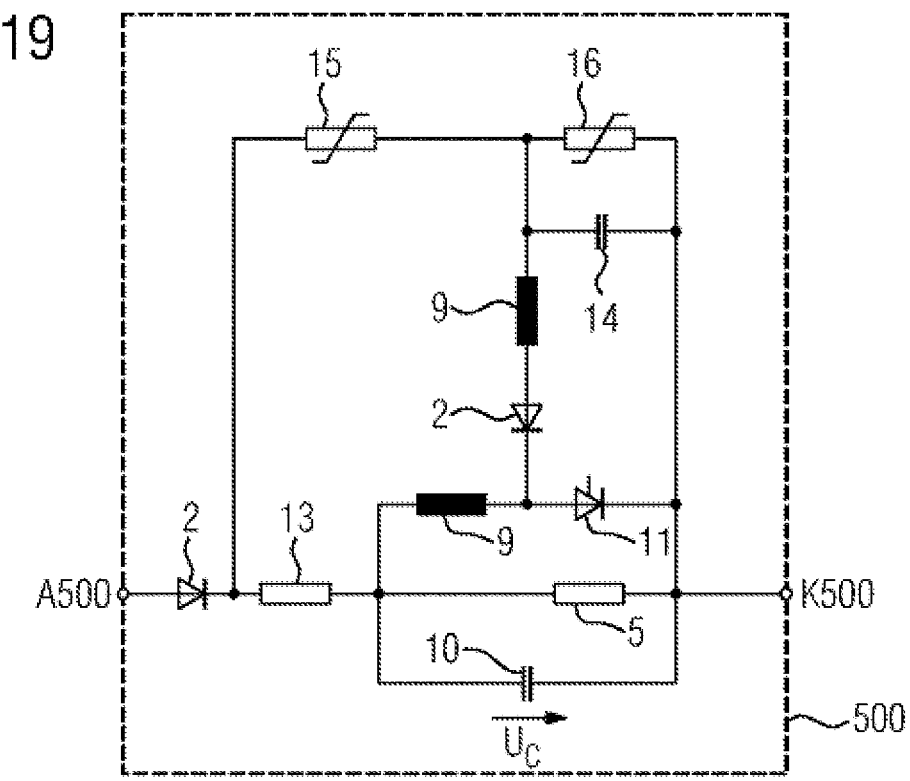

FIGS. 18 and 19 in each case show a further embodiment which makes possible extremely reduced overvoltage limiting with particularly narrow tolerances. The latter is suitable for satisfying extremely stringent requirements made of the overvoltage limiting which cannot be achieved by means of known arrangements in the high-voltage range. For this purpose, the varistors are divided into a unit having a high limiter voltage (15) and a unit having a low limiter voltage (16). A high-resistance snubber resistor (5) can optionally be used in order to better define the static voltage division, which would otherwise be determined by the characteristic of tolerances of the varistors. An expedient dimensioning is to choose the sum of both limiter voltages of the varistors (15, 16), with a certain safety margin, to be above the highest continuous DC voltage of the grid. This dimensioning limit is known from other varistor limiters and has to be complied with in order to avoid high static energy losses. The resulting dynamic limiter voltage (with high pulsed current) is then undesirably high (typically elevated by approximately a factor of 2) because the characteristic curves of real varistors are not ideally steep.

However, the quotient of the two limiter voltages can be chosen as a further degree of freedom in the arrangement according to the invention. Said quotient-depending on the exact varistor characteristic curves-is typically chosen such that the limiter voltage (U15) of the unit (15) is approximately 3 times to 5 times that of the unit (16). In the steady-state case, in a resulting manner approximately the limiter voltage of the unit (16) is present as positive precharge voltage (UC) at the capacitive energy store (10). By triggering the thyristor (11), it is then possible to reverse the polarity of said voltage, with the result that the limiter voltage of the entire arrangement instantaneously decreases by double the magnitude of the precharge voltage mentioned above. The reduced limiter voltage then makes possible significantly better, dynamic overvoltage limiting. The incipient limiter current subsequently leads to charging of the capacitive energy store (10) to the positive precharge voltage previously present, which is desired in the steady state. The triggering of the thyristor can take place synchronously with that of the current pulse generator. It is furthermore advantageous that the same components (9, 10, 11) as in the current pulse generator can be used. Since the overvoltage limiter in the circuit arrangements according to the invention can be used multiply for a plurality of switches, the outlay for an optimized embodiment according to FIG. 18 will be worthwhile in many applications.

Figure 20:
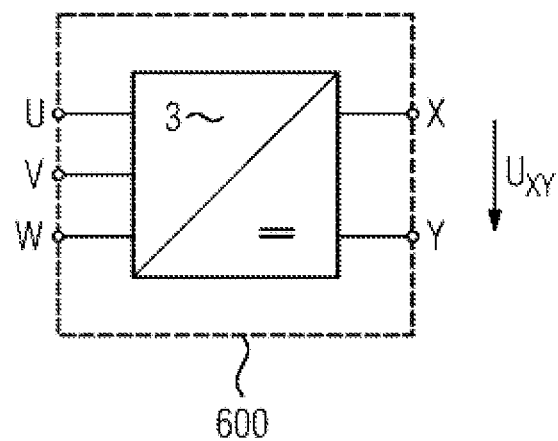
FIGS. 20-21 show solutions for the controllability of current division.
Figure 21:
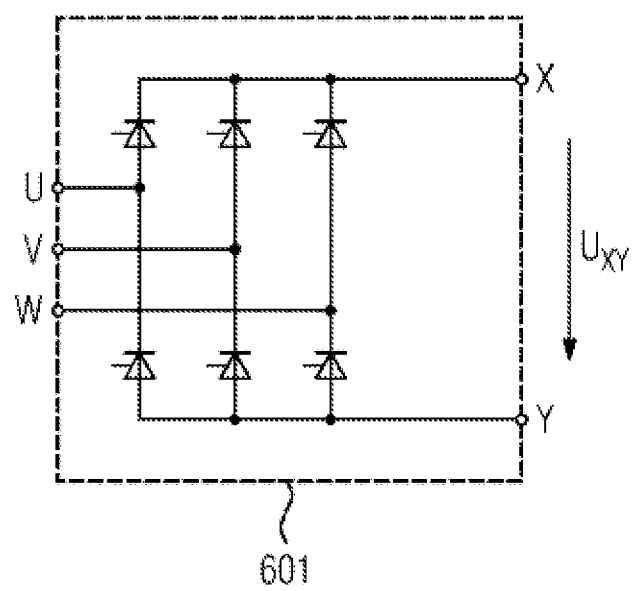

A further problem of extensive meshed DC grids arises with regard to the current division in electrically parallel line sections. Since said current division is established in a non-controllable manner by the resistive voltage drops, a defined limit load and good utilization of the lines-without overloading-cannot be ensured. In the case of the hybrid switches (100) according to the invention, the following measure is afforded as a solution involving low outlay for this controllability of the current division (FIG. 20 and FIG. 21):

A controllable DC voltage source (600) having a low voltage and power, compared with the DC grid, is connected in parallel with a hybrid switch (100) by its output terminals (X, Y).

In this case, the polarity of the applied voltage should be chosen such that it corresponds to the reverse direction of the uncontrolled unit (12), or of the corresponding semiconductor diode. This arrangement makes it possible to control its natural forward voltage drop from positive values continuously to negative values and thus to influence the current distribution in a desired manner. This function can at any time be activated by opening the parallel, controlled switch (18) and be deactivated by closing said switch.

A simple line-commutated converter (601) having only one current and voltage polarity on the output side can perform the function of the DC voltage source (600), which can in principle be added to each hybrid switch (100). In general, however, it will suffice to connect up only one or a few of the hybrid switches. For high-voltage hybrid switches (100) consisting of a series connection of a plurality of hybrid switches, it is advantageous to connect the DC voltage source (600) only to one of the series-connected units. In this way it is possible to avoid a situation in which the voltage source (600) has to have a blocking capability for unnecessarily high voltages on the output side.

The invention claimed is:

1. A device for switching in a DC voltage grid, the device comprising:
   a first series-connected circuit of hybrid switches having two hybrid switches connected in series in opposite directions and first and second connections, said two hybrid switches each having a parallel circuit containing an uncontrolled current-direction-dependent switch and a controllable switch, wherein a central junction point between said hybrid switches forming a third connection and said two hybrid switches connected in series in opposite directions can be inserted by said first connection and said second connection into a first line of the DC voltage grid;
   two polarized damping elements configured to absorb energy in only one polarity of a terminal voltage present and including first and second polarized damping elements, said first polarized damping element connected to said first connection for said first series-connected circuit of hybrid switches and can be connected to at least one of a second line of the DC voltage grid or a ground potential, said second polarized damping element connected to said second connection of said first series-connected circuit of hybrid switches and can be connected to at least one of the second line of the DC voltage grid or the ground potential; and
   a current pulse generator, which in response to a control command generating a unipolar current pulse passing via said third connection and said two polarized damping elements, such that a current direction in one of said hybrid switches can be momentarily reversed.

2. The device according to claim 1, further comprising:
   at least one second series-connected circuit of hybrid switches containing further hybrid switches connected in series with one another in opposite directions and having further first and second connections, between said further hybrid switches a central junction point is formed and defines a further third connection, said further hybrid switches can be switched into at least one further line of the DC voltage grid by said further first and second connections;
   further polarized damping elements; and
   blocking diodes, said central junction point of each of said first and second series-connected circuit of hybrid switches connected in series with one another in opposite directions is connected to said current pulse generator via one of said blocking diodes.

3. The device as claimed in claim 2, wherein said further polarized damping elements form a further pair of further polarizing damping elements assigned to said second series-connected circuit of hybrid switches.

4. The device according to claim 1,
   further comprising two further hybrid switches connected in series in opposite directions connected to the second line and defining a second series-connected circuit of hybrid switches having further first and second connections, said first polarized damping element is connected to said first connection of said first series-connected circuit of hybrid switches and to said further first connection of said second series-connected circuit of hybrid switches and said second polarized damping element is connected to said second connection of said first series-connected circuit of hybrid switches and to said further second connection of said second series-connected circuit of hybrid switches; and
   wherein said current pulse generator has a first connection connected to said central junction point of the first series-connected circuit of hybrid switches and a second connection of said current pulse generator is connected to a central junction point of said second series-connected circuit of hybrid switches.

5. The device according to claim 1, wherein at least one of said polarized damping elements or said current pulse generator consists of a series circuit containing in each case a plurality of units, said units having have center taps, and at least one of said center taps is connected to the ground potential.

6. The device according to claim 1, further comprising:
   a second series-connected circuit of hybrid switches having two further hybrid switches connected in series in opposite directions, between said further hybrid switches a central junction point is formed and defines a further third connection; and
   two further polarized damping elements, said further third connection of said second series-connected circuit of hybrid switches is connected to said third connection of said first series-connected connected hybrid switches in the first line, such that the current pulse of said current pulse generator can also be fed into the further third connection of said second series-connected circuit of hybrid switches.

7. The device according to claim 1, further comprising an additional controllable DC voltage source connected in parallel with at least one of said hybrid switches, a voltage of said additional controllable DC voltage source having a polarity opposite to a forward voltage drop of said uncontrolled current-direction-dependent switch.

8. The device according to claim 1, wherein said uncontrolled current-direction-dependent switch is a semiconductor diode.

9. The device according to claim 1, wherein said controllable switch is a vacuum interrupter.

10. The device according to claim 1, wherein said current pulse generator contains a controllable switch, at least one capacitive energy store and an inductance, said at least one capacitive energy store and said inductance can be momentarily electrically connected to one another via said controllable switch, said current pulse generator further having a circuit path for charging said capacitive energy store from a voltage of the DC voltage grid and for overvoltage limiting, said circuit path containing at least one of said at least one capacitive energy store, a series resistor and a further blocking diode.

11. The device according to claim 1, further comprising additional units for overvoltage limiting are connected in parallel with said current pulse generator or are integrated into said current pulse generator.

12. The device according to claim 11, wherein said additional units for overvoltage limiting are selected from the group consisting of nonlinear resistors and varistors.

13. The device according to claim 12, wherein a voltage level of said overvoltage limiting can be dynamically adapted in a manner synchronized with an initiation of the current pulse of said current pulse generator.

14. A method for interrupting a direct-current power grid, which comprises the following steps of:

generating a current pulse which, in a hybrid switch having a parallel circuit containing an uncontrolled current-direction-dependent switch and a controllable switch, momentarily brings about a current reversal on a side situated in a current flow direction, such that the controllable switch of the hybrid switch can quench during the current reversal and thus isolates a current feed between a source and a load, wherein a polarized damping element on the side situated in the current flow direction damps a polarity-reversed voltage on the side situated in the current flow direction and thereby de-energizes a load-side line inductance, wherein a current pulse generator damps an elevated voltage on a side situated opposite to the current flow direction.

* * * * *